US010250927B2

(12) United States Patent
Stewart

(10) Patent No.: US 10,250,927 B2
(45) Date of Patent: Apr. 2, 2019

(54) METHOD AND APPARATUS FOR SYNCHRONIZING PLAYBACKS AT TWO ELECTRONIC DEVICES

(71) Applicant: InterDigital CE Patent Holdings, Paris (FR)

(72) Inventor: John Sidney Stewart, Indianapolis, IN (US)

(73) Assignee: Interdigital CE Patent Holdings, rue due Colonel Moll (FR)

( * ) Notice: Subject to any disclaimer, the term of this patent is extended or adjusted under 35 U.S.C. 154(b) by 0 days.

(21) Appl. No.: 15/107,641

(22) PCT Filed: Jan. 31, 2014

(86) PCT No.: PCT/US2014/014146
§ 371 (c)(1),
(2) Date: Jun. 23, 2016

(87) PCT Pub. No.: WO2015/116162
PCT Pub. Date: Aug. 6, 2015

(65) Prior Publication Data
US 2016/0323612 A1    Nov. 3, 2016

(51) Int. Cl.
*H04N 7/18*    (2006.01)
*H04N 21/242*    (2011.01)
(Continued)

(52) U.S. Cl.
CPC ....... *H04N 21/242* (2013.01); *H04N 21/2223* (2013.01); *H04N 21/233* (2013.01);
(Continued)

(58) Field of Classification Search
CPC ......... H04N 21/4126; H04N 21/41407; H04N 21/42222; H04N 21/44204; H04N 21/44222
See application file for complete search history.

(56) References Cited

U.S. PATENT DOCUMENTS 5,040,081 A * 8/1991 McCutchen ......... G11B 27/028
386/207
5,642,171 A    6/1997 Baumgartner et al.
(Continued)

FOREIGN PATENT DOCUMENTS

CN    1742492    2/2003
CN    1728794 A    2/2006
(Continued)

OTHER PUBLICATIONS

International Search Report dated Oct. 9, 2014 in corresponding International Application No. PCT/US2014/014146.
(Continued)

*Primary Examiner* — James R Sheleheda
(74) *Attorney, Agent, or Firm* — Reitseng Lin; Jerome G. Schaefer

(57) ABSTRACT

A method for synchronizing playback of a program including a video and associated first audio at a first electronic device with playback of a second audio associated with the program at a second electronic device that also receives the first audio, the method comprising: decoding, by a first audio decoder in the second electronic device, the first audio, and outputting the decoded first audio; decoding, by a second audio decoder in the second electronic device, the second audio and outputting the decoded second audio for playing back by the second electronic device; receiving a user command to synchronize the playback of the video at the first electronic device and playback of the second audio at the second electronic device; responsive to the user command, the method further comprising capturing, by a capturing device in the second electronic device, the playback of the first audio at the first electronic device; determining, by the second electronic device, an offset between the outputted decoded first audio and the captured first audio; and adjusting outputting of the decoded second audio (Continued)

according to the offset, so that the playback of the first audio at the first electronic device is synchronized with the playback of the second audio at the second electronic device.

20 Claims, 5 Drawing Sheets

(51) Int. Cl.
| | |
|---|---|
| H04N 21/422 | (2011.01) |
| H04N 21/41 | (2011.01) |
| H04N 21/43 | (2011.01) |
| H04N 21/439 | (2011.01) |
| H04N 21/222 | (2011.01) |
| H04N 21/233 | (2011.01) |
| H04N 21/6336 | (2011.01) |
| H04N 21/647 | (2011.01) |

(52) U.S. Cl.
CPC ..... *H04N 21/4122* (2013.01); *H04N 21/4126* (2013.01); *H04N 21/42203* (2013.01); *H04N 21/42222* (2013.01); *H04N 21/4302* (2013.01); *H04N 21/4307* (2013.01); *H04N 21/4394* (2013.01); *H04N 21/6336* (2013.01); *H04N 21/64707* (2013.01); *H04N 21/64723* (2013.01)

(56) References Cited

U.S. PATENT DOCUMENTS

| | | | |
|---|---|---|---|
| 7,907,212 B2 | 3/2011 | Girardeau, Jr. et al. | |
| 8,111,843 B2 | 2/2012 | Logalbo et al. | |
| 8,265,463 B2 | 9/2012 | Kohno | |
| 8,640,181 B1* | 1/2014 | Inzerillo | H04N 21/4307 348/500 |
| 2006/0149850 A1* | 7/2006 | Bowman | G11B 27/10 709/231 |
| 2006/0156374 A1 | 7/2006 | Hu et al. | |
| 2007/0220561 A1 | 9/2007 | Girardeau et al. | |
| 2008/0209482 A1* | 8/2008 | Meek | H04N 5/607 725/105 |
| 2008/0219641 A1* | 9/2008 | Sandrew | H04N 21/4307 386/201 |
| 2010/0171626 A1 | 7/2010 | Darshan et al. | |
| 2010/0254455 A1 | 10/2010 | Matsunaga | |
| 2010/0303159 A1* | 12/2010 | Schultz | H04N 7/163 375/240.28 |
| 2011/0221910 A1 | 9/2011 | Nonaka et al. | |
| 2011/0301730 A1* | 12/2011 | Kemp | G10L 19/008 700/94 |
| 2012/0039582 A1 | 2/2012 | Foo et al. | |
| 2012/0102233 A1* | 4/2012 | Shah | G06F 17/30017 709/248 |
| 2012/0105719 A1 | 5/2012 | Fratti et al. | |
| 2013/0124664 A1* | 5/2013 | Fonseca, Jr. | H04L 67/125 709/208 |
| 2013/0135526 A1 | 5/2013 | Minemura | |
| 2013/0177286 A1* | 7/2013 | Miazzo | H04N 9/87 386/201 |
| 2013/0272672 A1* | 10/2013 | Padro Rondon | G03B 31/04 386/201 |
| 2013/0346631 A1* | 12/2013 | Gandhi | H04N 21/4126 709/248 |
| 2014/0028914 A1* | 1/2014 | Polak | H04N 5/04 348/515 |
| 2014/0229963 A1* | 8/2014 | Petrovic | H04N 21/252 725/13 |
| 2015/0046953 A1* | 2/2015 | Davidson | G06K 9/00758 725/74 |
| 2015/0120953 A1* | 4/2015 | Crowe | H04L 65/60 709/231 |
| 2016/0309213 A1* | 10/2016 | Du | H04N 21/43637 |
| 2016/0323612 A1* | 11/2016 | Stewart | H04N 21/4122 |
| 2016/0345051 A1* | 11/2016 | Stewart | H04N 21/4104 |
| 2017/0086004 A1* | 3/2017 | Downing | G06F 3/165 |

FOREIGN PATENT DOCUMENTS

| | | |
|---|---|---|
| CN | 101803390 A | 8/2010 |
| CN | 102355748 A | 2/2012 |
| CN | 102405639 A | 4/2012 |
| CN | 103119952 A | 5/2013 |
| CN | 103237203 | 8/2013 |
| EP | 0372155 B1 | 4/1997 |
| EP | 2043323 | 4/2009 |
| EP | 1390942 B1 | 8/2012 |
| JP | 2008011302 A2 | 1/2008 |
| JP | 2008193561 A2 | 8/2008 |
| JP | 2010171626 A | 8/2010 |
| JP | 2010206593 A | 9/2010 |
| JP | 2013115782 A | 6/2013 |
| TW | 201015997 A | 4/2010 |
| WO | WO2009038615 | 3/2009 |
| WO | 2012038506 A1 | 3/2012 |
| WO | WO2012049223 | 4/2012 |

OTHER PUBLICATIONS

Roopalakshmi et al., "A novel spatio-temporal registration framework for video copy localization based on multimodal features"; Signal Processing 93 (2013): 2339-2351; Information Technology Department, National Institute of Technology Karnataka, Surathkal, Mangalore 575025, India, Aug. 2013.

* cited by examiner

METHOD AND APPARATUS FOR SYNCHRONIZING PLAYBACKS AT TWO ELECTRONIC DEVICES

This application claims the benefit, under 35 U.S.C. § 365 of International Application PCT/US2014/014146, filed Jan. 31, 2014, which was published in accordance with PCT Article 21(2) on Aug. 6, 2015. The international application is expressly incorporated by reference herein in its entirety for all purposes.

BACKGROUND OF THE INVENTION

Field of the Invention

The present principles of the embodiments generally relate to a method and apparatus for synchronizing playbacks of two electronic devices and more particularly synchronizing playback of a video and a first audio associated with the video at one of the two electronic devices and playback of a second audio, different from the first audio and associated with the video, at the other electronic device.

Background Information

Multiple ways, such as broadband television (TV) and mobile TV, coexist today to bring multimedia steams or broadcast programs to end users. With broadband TV, the receiver is usually a standard TV device, connected to a receiving device, called a Set-Top Box or STB. With mobile TV, the receiver device is a mobile terminal such as a mobile phone, a Personal Digital Assistant (PDA), or a tablet.

In a MPEG-2 stream, several components, e. g. audio, video, are synchronized between each other in order to be rendered at the proper time. This is called inter-component synchronization. A common example is the lip synchronization, noted lip-sync, which provides the audio at the exact same time as the lips of the person move on the corresponding video. Such synchronization is typically achieved using specific time stamps. In MPEG-2 streams, the Presentation Time Stamp, or PTS, ensures such synchronization. The PTS of the audio sample indicates its presentation time, in reference to the internal clock (which is set thanks to the Program Clock Reference or PCR also contained in the MPEG-2 stream); in the same way, the PTS of the video sample indicates its presentation time, also in reference to the same internal clock.

However, when two electronic devices respectively receiving a video stream and an audio stream, the synchronization between the respective playbacks cannot be achieved easily. Accordingly, there is a need for a method and apparatus for synchronizing audio and video respectively received by two different receiving devices. The present invention addresses these and/or other issues.

SUMMARY OF THE INVENTION

In accordance with an aspect of the present invention, a method for synchronizing playback of a program including a video and associated first audio at a first electronic device with playback of a second audio associated with the program at a second electronic device that also receives the first audio is disclosed. The method comprises steps of decoding, by a first audio decoder in the second electronic device, the first audio, and outputting the decoded first audio; decoding, by a second audio decoder in the second electronic device, the second audio and outputting the decoded second audio for playing back by the second electronic device; receiving a user command to synchronize the playback of the video at the first electronic device and playback of the second audio at the second electronic device; responsive to the user command, the method further comprising capturing, by a capturing device in the second electronic device, the playback of the first audio at the first electronic device; determining, by the second electronic device, an offset between the outputted decoded first audio and the captured first audio; and adjusting outputting of the decoded second audio according to the offset, so that the playback of the first audio at the first electronic device is synchronized with the playback of the second audio at the second electronic device.

In one embodiment, the user command is generated by a user activating an input mechanism.

In one embodiment, the method further comprises playing back the second audio by the second electronic device from a first position, which is a first time interval away from a beginning of the program in a normal playback of the program, wherein when the playback of the second audio is at the first position, the playback of the program by the first electronic device is at a second position, which is a second time interval away from the beginning of the program in a normal playback, and wherein a difference between the first time interval and the second time interval is within a predefined interval.

In one embodiment, the method further comprises positioning the playback of the second audio to the first position responsive to a user signal.

In another embodiment, the method further comprises if the step of determining the offset fails, asking a user to input the user command again, and the steps of capturing and determining the offset are repeated.

In another embodiment, the method further comprises adjusting, by the first audio decoder, an output by outputting the decoded first audio according to the offset, so that outputs of the first and second audio decoders are synchronized.

In another embodiment, the method further comprises downloading the first audio and the second audio to the second electronic device before playing back the second audio by the second electronic device. Both the program received by the first electronic device, and the first audio and the second audios received by the second electronic device may be downloaded from a first source, or from a second source and the first source, respectively.

In another embodiment, the method further comprises determining a presentation time stamp associated with a sample in the decoded first audio, which corresponds a newly captured audio sample according to the offset, and adjusting playback of the second audio comprising outputting a sample in the decoded second audio associated with the determined presentation time stamp.

In accordance with another aspect of the present invention, a second electronic device is disclosed. The second device comprises first and second audio decoders for respectively decoding first and second audios received by the second electronic device and outputting the decoded first and second audios, the first and second audios associated with a program comprising a video and the first audio and being played back by a first electronic device; an audio capturing device for capturing the first audio being played back by the first electronic device; an audio correlator receiving the captured playback first audio and the decoded first audio from the first audio decoder; and a processor, wherein when the processor receives a user command to synchronize playback of the second audio at the second electronic device with the playback of the video at the first electronic device, the processor is configured to instruct the audio correlator to determine an offset between the received captured playback first audio and the received decoded first audio outputted from the first audio decoder and instruct the second audio decoder to output the decoded second audio according to the offset.

In one embodiment, the second electronic device further comprises a video player playing back the second audio by the second electronic device from a first position, which is a first time interval away from a beginning of the program in a normal playback of the program, wherein when the playback of the second audio is at the first position, the playback of the program at the first electronic device is at a second position, which is a second time interval away from the beginning of the program in a normal playback, and wherein a difference between the first time interval and the second time interval is within a predefined interval. The video player may position the playback of the second audio to the first position responsive to a user signal. The second electronic device may include an input mechanism (48, 49) for a user to input the user command. If determining the offset fails, the processor may be configured to ask a user to input the user command again, and instruct the audio correlator to determine the offset again.

In one embodiment, the processor may be configured to instruct the first audio decoder to adjust an output by outputting the decoded first audio according to the offset, so that outputs of the first and second audio decoders are synchronized.

In another embodiment, the first audio and the second audio may be downloaded to the second electronic device (4) before the second electronic device playing back the second audio In another embodiment, the program received by the first electronic device, and the first audio and the second audios received by the second electronic device are downloaded from a first source, or respectively from a second source and the first source.

In another embodiment, the processor may be configured to instruct the audio correlator to determine a presentation time stamp associated with a sample in the decoded first audio, which corresponds a newly captured audio sample according to the offset, and instruct the second audio decoder to output a sample in the decoded second audio associating with the determined presentation time stamp.

In accordance with another aspect of the present invention, a second electronic device is disclosed. The second device comprises first and second means for respectively decoding first and second audios received by the second electronic device and outputting the decoded first and second audios, the first and second audios associated with a program comprising a video and the first audio and being played back by a first electronic device; means for capturing the first audio being played back by the first electronic device; correlator means for receiving the captured playback first audio and the decoded first audio from the first means; and processing means, wherein when the processing means receives a user command to synchronize playback of the second audio at the second electronic device with the playback of the video at the first electronic device, the processing means is configured to instruct the correlator means to determine an offset between the received captured playback first audio and the received decoded first audio outputted from the first means and instruct the second means to output the decoded second audio according to the offset. The second electronic device may include means for a user to input the user command.

In one embodiment, the second electronic device further comprises a video player playing back the second audio by the second electronic device from a first position, which is a first time interval away from a beginning of the program in a normal playback of the program, wherein when the playback of the second audio is at the first position, the playback of the program at the first electronic device is at a second position, which is a second time interval away from the beginning of the program in a normal playback, and wherein a difference between the first time interval and the second time interval is within a predefined interval. The video player may position the playback of the second audio to the first position responsive to a user signal.

In another embodiment, if determining the offset fails, the processing means may be configured to ask a user to input the user command again, and instruct the correlator means to determine the offset again.

In another embodiment, the processing means may be configured to instruct the first means to adjust an output by outputting the decoded first audio according to the offset, so that outputs of the first and second means are synchronized.

In another embodiment, the first audio and the second audio may be downloaded to the second electronic device before the second electronic device playing back the second audio.

In another embodiment, the program received by the first electronic device, and the first audio and the second audios received by the second electronic device may be downloaded from a first source, or respectively from a second source and the first source.

In another embodiment, the processing means may be configured to instruct the correlator means to determine a presentation time stamp associated with a sample in the decoded first audio, which corresponds a newly captured audio sample according to the offset, and instruct the second means to output a sample in the decoded second audio associating with the determined presentation time stamp.

In all three aspects, the first electronic device may be one of a television receiver, a theater video reproduction device, and a computer.

DETAILED DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 4:
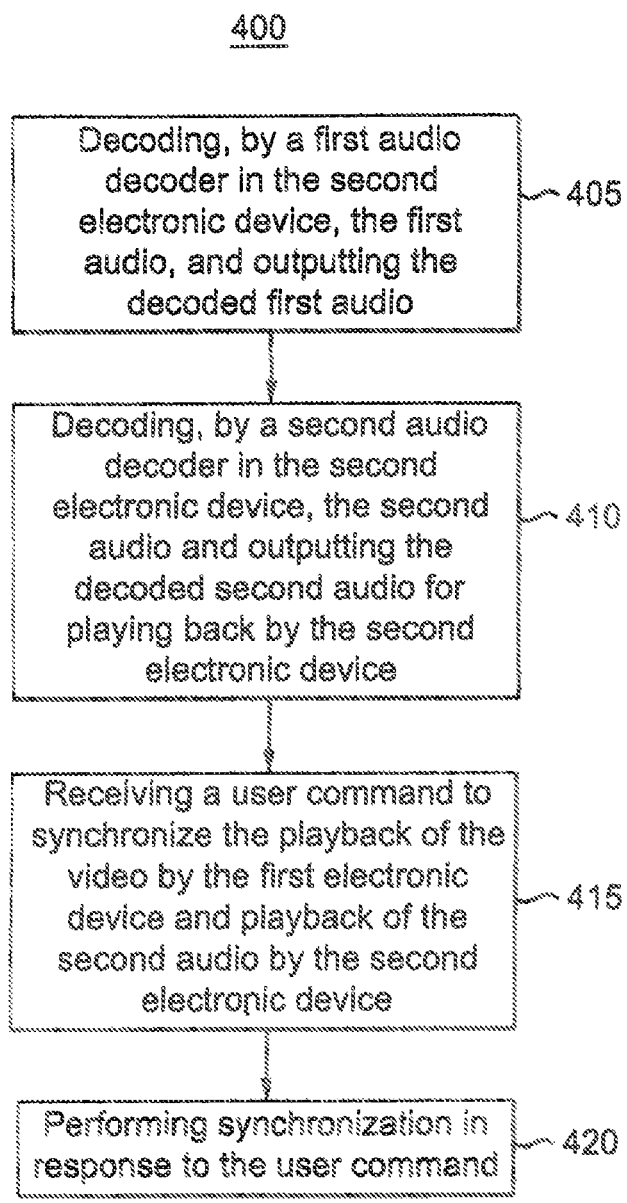
Figure 5:
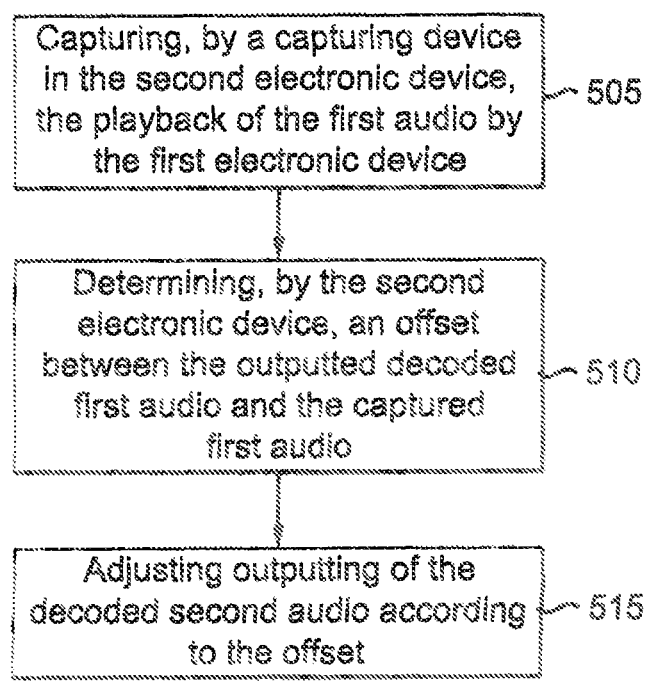

FIG. 4, shows an exemplary process 400 performed at the mobile terminal 4 for synchronizing the playback of the video at the TV 3 and playback of the second audio at the mobile terminal 4 according to an exemplary embodiment of the present invention; and FIG. 5 shows an exemplary process 420 to synchronize the two playbacks in response to a user command to synchronize the playback of the video at the TV 3 and playback of the second audio at the mobile terminal 4 according to an exemplary embodiment of the present invention.

The exemplifications set out herein illustrate preferred embodiments of the invention, and such exemplifications are not to be construed as limiting the scope of the invention in any manner.

DETAILED DESCRIPTION

Figure 1:
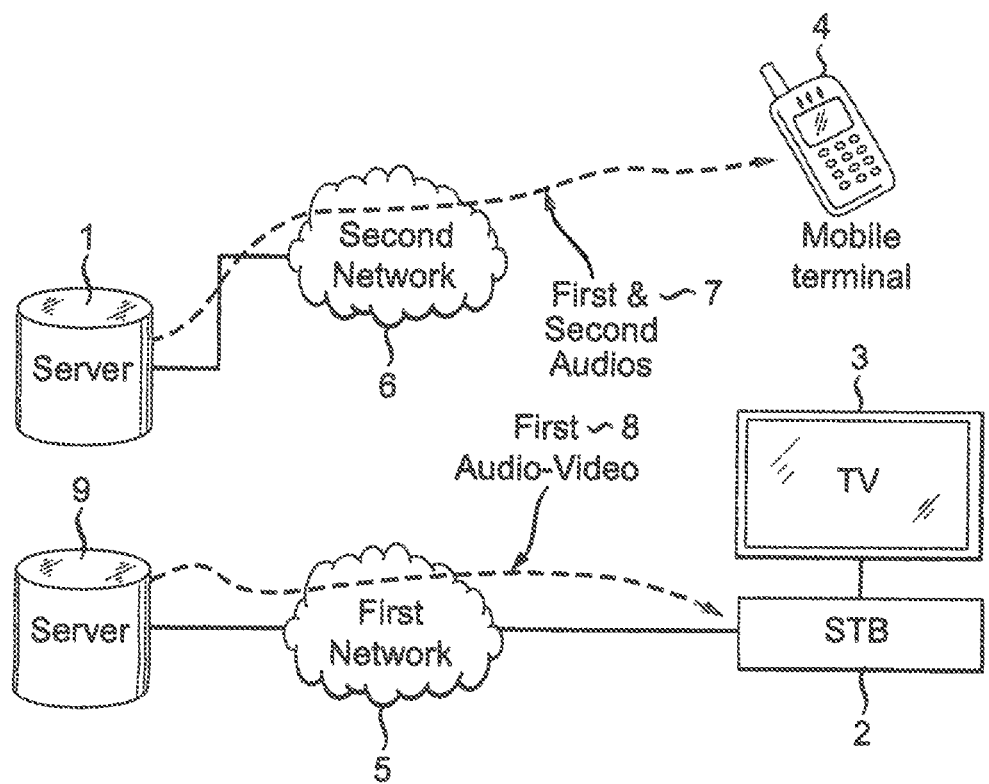
FIG. 1 shows a system according to an exemplary embodiment of the present invention.

Referring now to the drawings, and more particularly to FIG. 1, a block diagram of a system compliant with an embodiment of the invention is shown. A first stream 8, which is an audio-video stream, such as a MPEG-2 Transport Stream, is transmitted by a video server 9 on the first network 5, which, for example, is a broadband network. The first stream 8 is received by the set-top box (STB) 2. The first stream 8 carrying a program including a first audio and an associated video and the program is being played back by the television (TV) 3 after the program has been processed by the STB 2. As known in the art, the STB 2 synchronizes the first audio with the video by using the synchronization signals embedded in the first stream 8. Thus, the playback of the video and the first audio at the TV 3 is synchronized.

The term "synchronization" as used herein means that the time difference between the audio and the video does not exceed 20 milliseconds (ms) if the audio is advanced with respect to the video or 40 ms if the audio is delayed with respect to the video.

Although the MPEG-2 encoding format is used as an example, encoding according to Digital Video Broadcasting (DVB), Digital Video Broadcasting-Handheld (DVB-H), Advanced Television Systems Committee-Mobile/Handheld (ATSC-M/H), and ATSC A/53 can be used as well.

Furthermore, the first stream 8 can be a broadcast program broadcast from a broadcast source via satellite, terrestrial, or cable. The first stream 8 can also be coming from a local drive, a network drive, or other storage devices accessible by the STB 2. Thus, in some embodiments, the first network 5 is not needed. The first stream 8 may represent an analog television signal as well. In one embodiment, the STB 2 may be integrated into the TV 3, so that the TV 3 performs both sets of functions.

A second stream 7 including the first audio and a second audio is transmitted by a video server 1 through a second network 6 to a mobile terminal 4. The second audio is associated with the video in the first stream 8 but is different from the first audio. For example, the second audio carries a different language from the first audio. According to the principles of an embodiment of the invention, a user can watch the video on the TV 3 and listen to the second audio on the mobile terminal 4 with the two playbacks synchronized.

The second stream 7 is transmitted to the mobile terminal 4 upon demand and the second stream 7 may also include the associated video. The first stream 8 can be broadcasted to the STB 2 or transmitted to the STB 2 upon demand.

The second network 6 can also be the Internet, a satellite network, a Wi-Fi network, or other data networks accessible wirelessly or with wire by the mobile terminal 4.

According to the embodiment, the second stream 7 can be distributed through a DVB-H network, an ATSC-M/H network or other networks supporting other encoding standards, as long as the mobile terminal 4 supports the encoding formats. The second stream 7 can also be received from a storage device accessible by the mobile terminal 4, for example, a storage device connected to the mobile terminal 4 wirelessly or with wire, such as USB. Thus, in some embodiments, the second network 6 is not needed. Although illustrated as a mobile terminal, the mobile terminal 4 might be a device such as a cellular terminal, a tablet, a Wi-Fi receiver, a DVB-T terminal, a DVB-H terminal, and an ATSC-M/H terminal.

The STB 2 may be located in a public hot spot, which comprises one or more displays for presenting the video and one or more speakers for outputting the audible signal of the first audio. When in the public hot spot, an end user listens on a mobile terminal to an audio associated to the video displayed in the hot spot. According to principles of an embodiment of the invention, the audio played by the mobile terminal 4 is synchronized, utilizing a microphone attached or included in the mobile terminal 4, with the video being played back by the STB 2. Different users in the hot spot watch the same video, but listening to different audio streams carrying, for example, different languages associated with that video.

Figure 2:
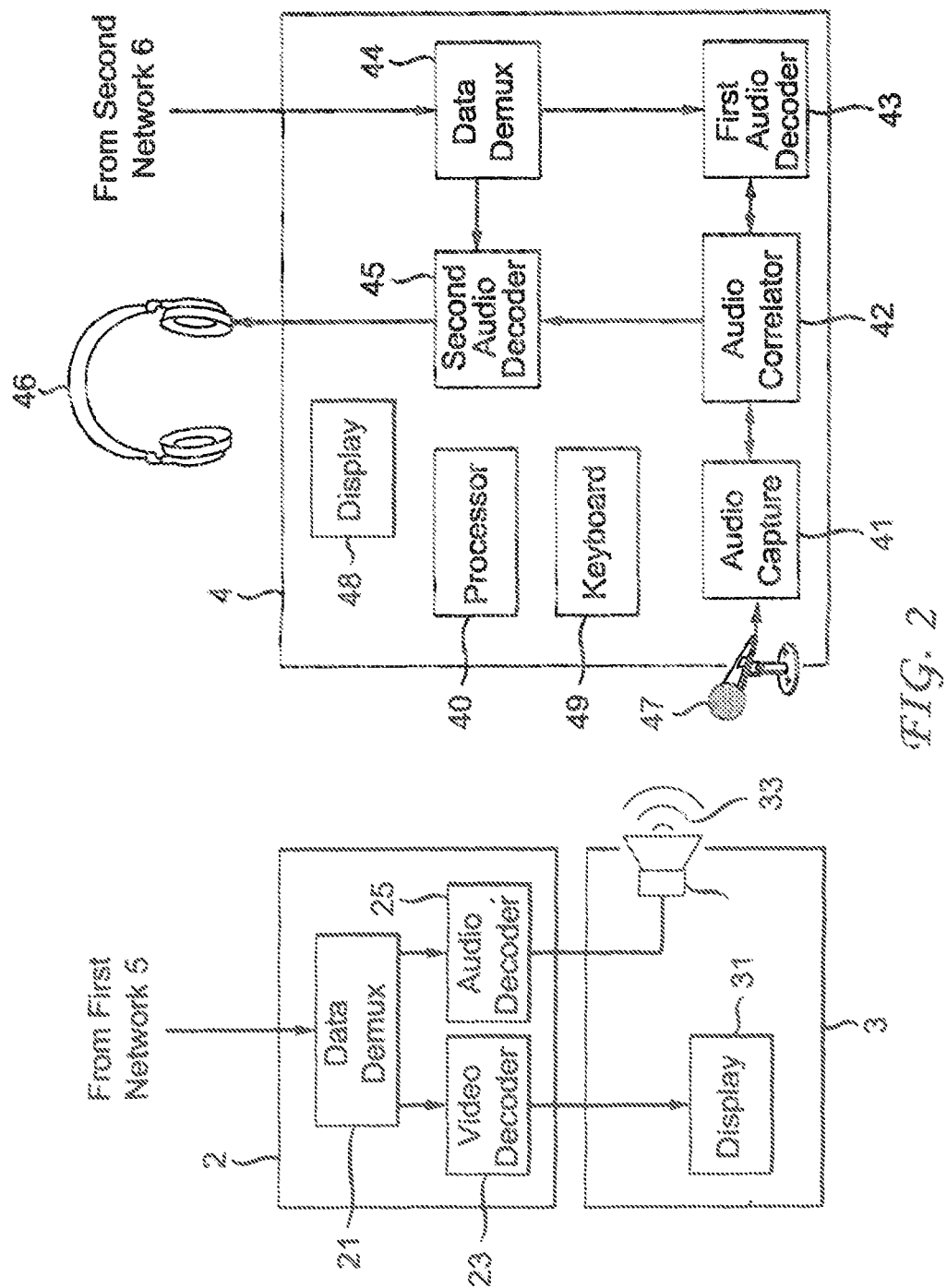
FIG. 2 shows more details of the STB 2, TV 3, and the mobile terminal 4 in the system shown in FIG. 1 according to an exemplary embodiment of the present invention.

FIG. 2 illustrates more details of the STB 2, TV 3, and the mobile terminal 4. As indicated previously, the functions of the STB 2 may be integrated into the TV 3. The STB 2 includes a data demultiplexer 21, a video decoder 23, and an audio decoder 25. The TV 3 includes a display 31 and a loud speaker 33. The data demultiplexer 21 separates and outputs the first audio stream and the video stream from the first stream 8 received from the first network 5. As noted before, although the first stream 8 is illustrated as coming from a network, the first stream 8 may come from a local drive, a network drive, or other storage devices accessible by the STB 2. In another embodiment, the first steam 8 can be an analog signal, and the video decoder 23 and audio decoder 25 should be replaced by, for example, a video demodulator and a sound demodulator, respectively.

The video stream is then decoded by the video decoder 23. The decoded video signal is received by the TV 3 and displayed on the display 31. The audio decoder 25 decodes the first audio stream and outputs the decoded first audio signal to the TV 3. The TV 3 generates an audible output signal, the playback first audio signal, via the speaker 33 in response to the decoded audio signal.

The mobile terminal 4 in this embodiment includes a main processor 40, an audio capture 41, an audio correlator 42, a first audio decoder 43, a data multiplexer 44, a second audio decoder 45, a speaker, such as headset or an ear phone 46, a microphone 47, a display 48, and a keyboard 49. The main processor 40 is the main controller of the mobile terminal 4. Functions of some elements, such as the audio capture 41, the audio correlator 42, the data demultiplexer 44, and/or the first and second audio decoders 43 and 45 may be integrated into the main processor 40.

In operation, the data demultiplexer 44 separates and extracts the first audio stream and the second audio stream from the second stream 7 received from the second network 6. The data demultiplexer 44 outputs the first and second audio streams respectively to the first audio decoder 43 and the second audio decoder 45. The first and second audio decoders 43 and 45 respectively produce decoded first and second audio signals in response to the respective first and second audio streams. The headset 46 renders the decoded second audio signal as an audible signal, the playback second audio signal.

The microphone 47 receives the audible output signal from the speaker 33. The audible signal received by the microphone 47 is digitized by the audio capture 41, which is also serves as a buffer and transmits the digitized audio signal to the audio correlator 42. It is noted that both the digitized audio and the decoded first audio signal represent the first audio but may not synchronize with each other.

The audio correlator 42 determines an offset between the digitized audio signal from the audio capture 41 and the decoded first audio signal from the first audio decoder 43. The audio correlator 42 may determine the offset by correlating at least a portion of a frequency range of the digitized audio signal with at least a portion of the frequency range of the decoded first audio signal. For example, the correlation of the digitized audio signal with the decoded first audio signal may be performed using the bass components, the center channel signal components, et cetera, of the respective signals.

Alternatively, the audio correlator 42 may interpret signal properties of the decoded first audio signal and the digitized audio signal to determine the offset as known in the art. For example, the signal-to-noise ratio of each signal may be determined and then correlated to provide a confidants factor with respect to the offset calculation.

As yet another alternative, the audio correlator 42 may interpret the peak levels, envelope and/or wave forms of the digitized audio signal and of the decoded first audio signal to determine the offset.

Once the offset has been determined, the audio correlator 42 informs the second audio decoder 45 to retreat or advance the decoded second audio signal to the speaker 46 according to the offset, so that the playback of second audio at the mobile terminal 4 is synchronized with the playback of the video at the TV 3. Thus, the offset between the playback of the first audio at the first electronic device and playback of the second audio at the second electronic device is eliminated. For example, if the audio correlator 42 determines that the offset is two seconds, i.e., the digitized audio signal from the speaker 33 is ahead of the decoded first audio signal, the second audio decoder 45 advances the audio output to the speaker 46 by two seconds. If the audio correlator 42 determines that the offset is negative two seconds, i.e., the digitized audio signal from the speaker 33 is behind the decoded first audio signal, the second audio decoder 45 re-outputs the output audio signal from two seconds before. Although in this embodiment, the decoded first audio signal is used as a reference for calculating the offset, the digitized audio signal can be used as a reference as well resulting in the sign of the offset being reversed.

Instead of informing the second audio decoder 45 the offset, the audio correlator 42 may determine a presentation time stamp (PTS) of the decoded first audio signal which is synchronized with the digitized audio signal most recently received according to the determined offset, inform the second audio decoder 45 of the PTS, so that the second audio decoder 45 can output the decoded second audio signal according to the determined PTS.

In order to reduce the time for the audio correlator 42 for determining the offset and/or for reducing the sizes of the buffers (not shown) for storing the digitized audio signal from the speaker 33 and the decoded first audio signal, the actual offset between the digitized audio signal and the decoded first audio signal should be less than a predetermined time, for example 10 seconds. This approach may also reduce the size of buffers (not shown) used in the first and second audio decoders 43 and 45.

According to the principles of an embodiment of the invention, a user of the mobile terminal 4 should determine the elapsed time of the playback of the video at the TV 3. This information may be indicated on the display 31 of the TV 3 as well known in the art or if the information is not shown on the display 31, the user can find out the starting time of the program from, for example, a program guide and compute the elapsed time using the current time. If the program is played back from a local drive, the user can easily compute the elapsed time by subtracting the playback start time from the current time. Once the user has determined the elapsed time of the video signal, the user should adjust the playback of the second audio at the mobile terminal 4 to a position having an elapsed time that is within the predetermined offset or time interval, preferably 10 seconds, of the determined elapsed time of the playback of the video at the TV 3. The user then instructs the mobile terminal 4 to synchronize the playback of the program at the TV 3 and the playback of the second audio at the mobile terminal 4 by activating an input mechanism, for example, pressing a particular key in the keyboard 49, a particular virtual key displayed on the display 48, or generating a particular gesture in front of the display 48 assuming that the main processor through the display 48 or a camera (not shown) is able to detect the particular gesture.

Figure 3:
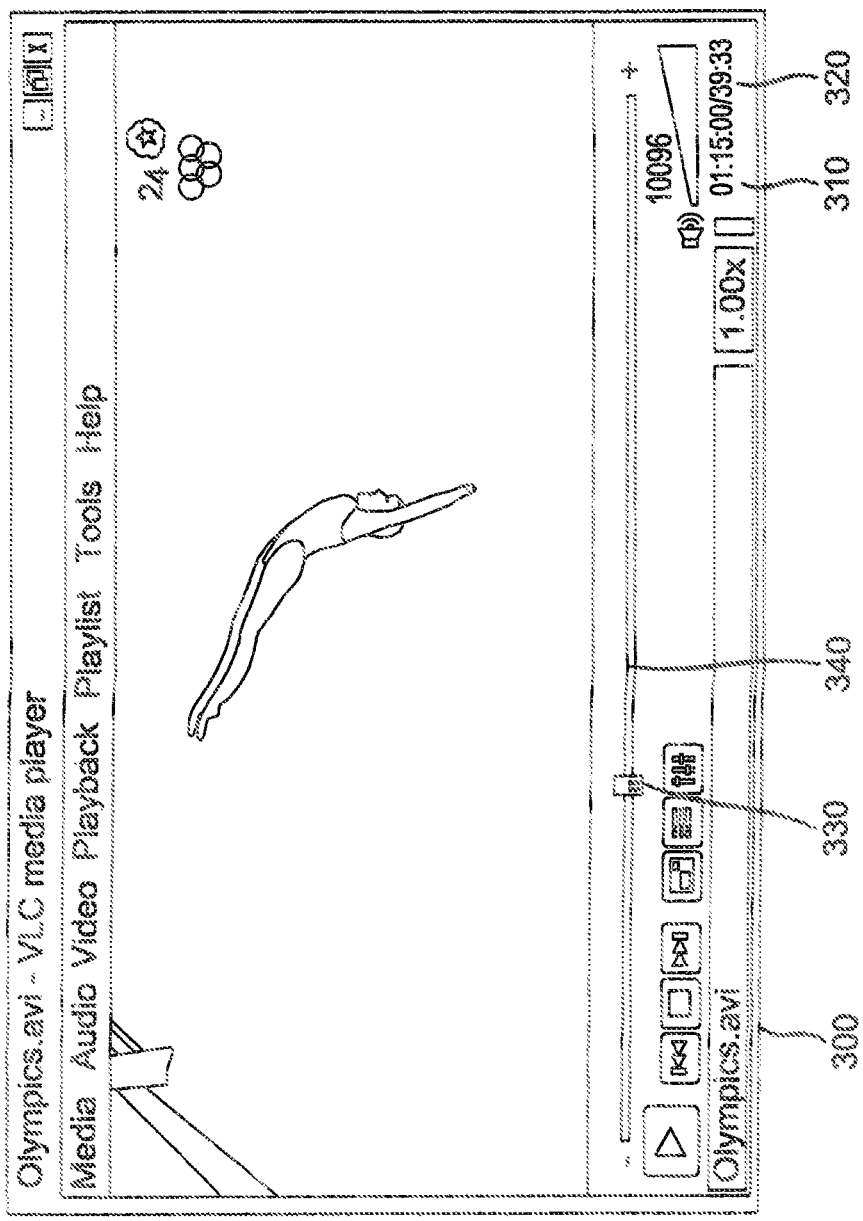
FIG. 3 shows an exemplary user interface of a video player on the display 48 of the mobile terminal 4.

A user may start the playback of the second audio by selecting the second audio, for example, from a web browser on the mobile terminal 4. After the second audio has been selected, the mobile terminal 4 invokes an audio/video player 300, the user interface of which, for example, is shown in FIG. 3, and starts playing back the second audio or the combination of the second audio and the video automatically or in response to another user signal. As shown in FIG. 3, the status bar 340 shows the status of the playback. The current playing position is indicated by an indicator 330, the total time of the program is indicated by an indicator 310, and the remaining time is indicated by an indicator 320. Since the total time is indicated as 01:15:00 (one hour and 15 minutes) and the remaining time is indicated as 39:33 (39 minutes and 33 seconds), a user is able to determine the elapsed time as 35 minutes and 27 seconds. The user can adjust the playback position by dragging the indicator 330 to a desired position or click on the desired position in the status bar 340, as well known in the art. Based on the indicators 310 and 320, the user is able to adjust the playback of the second audio or the combination of the second audio and the video to be within the exemplary predefined offset of 10 seconds of the playback of the video at the TV 3.

As well known in the art, the user inputs can be coming from the keyboard 49 or the display 48 or both. The main processor 40 then instructs the first and second audio decoders 43 and 45 to execute the desired synchronization functions.

Once the user has selected the playback position at the mobile terminal 4, the user can input another signal via the keyboard 49 or the display 48 requesting the main processor 40 to synchronize the playback of the video at the TV 3 and the playback of the second video at the mobile terminal 4. Once the main processor 40 receives the user signal to synchronize the two playbacks, the main processor 40 activates or instructs the audio capture 41 to capture the playback of the first audio at the TV 3 and the audio correlator 42 to determine the offset or the desired PTS. The signal requesting the main processor 40 to synchronize may be generated by activating a special key in the keyboard 49, special virtual button on the display 48, or a particular hand gesture detectable by the process 40 via the touch-sensitive display 48 or a camera (not shown).

Referring to FIG. 4 an exemplary process 400 performed at the mobile terminal 4 for synchronizing the playback of the video at the TV 3 and playback of the second audio at the mobile terminal 4 is shown. The process 400 is illustrated using the embodiments shown in FIGS. 1-3. A first electronic device, illustratively the TV 3, is playing back a program including a video and associated first audio. The video and the first audio comprised of the program are components of the first stream 8. The first stream 8 may be in analog form. It is assumed that in the playback of the program at the first electronic device, the first audio and the video are synchronized. This is the case, as well known in the art using synchronizing signals embedded in the first stream 8. The first electronic device can be a theater video reproduction device or a computer as well.

A second electronic device, illustratively the mobile terminal 4, is playing back a second audio associated with the program. The second electronic device also receives and decodes the first audio. The first and second audios received by the second electronic device are components of the second stream 7. Although illustrated as a mobile terminal, the second electronic device may be any electronic device that is able to receive the playback of the first audio at the first electronic device and preferably has an earphone output, so that playback of the second audio does not affect capturing the playback of the first audio from the first electronic device.

If the main processor 40 performs the functions of the audio capture 41, the audio correlator 42, the first and second audio decoders 43 and 45, the process 400 is performed by the main processor 40. However, those components still exist albeit inside the main processor 40.

At step 405, the main processor 40 is operative or configured to invoke or instruct the first audio decoder 43 to decode the first audio and output the decoded first audio. The first audio decoder 43 should have an output buffer, so that the first audio decoder 43 can select which sample in the output buffer to be outputted to the audio correlator 42.

At step 410, the main processor 40 is operative or configured to invoke or instruct the second audio decoder 45 to decode the second audio and output the decoded second audio for playing back by the second electronic device. The second audio decoder 45 should have an output buffer, so that the second audio decoder 45 can select which sample in the output buffer to be outputted to the headset 46 for playback.

At step 415, the main processor 40 is operative or configured to receive a user command to synchronize the playback of the video at the first electronic device and the playback of the second audio at the second electronic device. The user input is generated from activating an input mechanism, which may be a particular icon displayed on the display 46, a particular user gesture in front of the display 46, or a particular key on the keyboard 49.

Responsive to the user command to synchronize, the main processor 40 cooperating with other elements at step 420 is operative or configured to synchronize the two playbacks. An illustrative process flow of step 420 is shown in FIG. 5.

At step 505, the main processor 40 is operative or configured to invoke or instruct the audio capture 41 to capture, by a capturing device of the second electronic device, such as the microphone 47, the playback of the first audio at the first electronic device. The main processor 40 at step 510 is also operative or configured to invoke or instruct the audio correlator 42 to determine an offset between the decoded first audio from first audio decoder 43 in the mobile terminal 4 and the captured first audio, which is digitized by the audio capture 41. The main processor 40 is then operative or configured to invoke or instruct the second audio decoder 45 to adjust playback of the second audio by adjusting outputting decoded second audio according to the offset, so that playback of the first audio at the first electronic device is synchronized with playback of the second audio at the second electronic device. Since the playback of the first audio and the video at TV 3 is synchronized, and the playback of the first audio at the TV 3 and the playback of the second audio at the mobile terminal 4 are synchronized, the playback of the video at the TV 3 and the playback of the second audio at the mobile terminal 4 are also synchronized.

It is noted that the main processor 40 cooperating with other components, such as the second audio decoder 45 and a video player (not shown), the user interface of which may be shown as in FIG. 3, is operative or configured to play back the second audio from a first position, which is a first time interval away from a beginning of the program in a normal playback of the program, wherein when the playback of the second audio is at the first position, the playback of the program at the first electronic device is at a second position, which is a second time interval away from the beginning of the program in a normal playback, and wherein a difference between the first time interval and the second time interval is within a predefined interval.

The predefined interval can be user adjustable and preferably is 10 seconds or less, so that the synchronization can be achieved quickly. As discussed previously with respect to FIG. 3, a user can adjust or position the playback of the second audio to start from the first position through a user signal. In response to the user signal, the main processor 40 is operative or configured to instruct the second audio decoder 45 to adjust the output of the decoded second audio by, for example, outputting the sample in the decoded second audio corresponding to the first position.

In the case that the server providing the second audio to the mobile terminal 4 knows the position of the video transmitted to the STB 2, the server providing the second audio can determine a position in the second audio that corresponds to the current position of the video transmitted and transmit the second audio from the corresponding position in response to a user input to the server, for example, activating an icon on the server web site. As such, positioning the first position can be done at the mobile terminal 4 or at the server transmitting the second audio.

In one embodiment, if the difference between the first time interval and the second time interval is more than the predefined interval, the main processor 40 is operative or configured to ask the user to adjust the first position in response to the user command to synchronize the two playbacks.

In another embodiment, if the step of determining the offset fails, the main processor 40 is operative or configured to ask a user to input the user command to synchronize the two playbacks again and the steps of capturing and determining the offset are repeated.

According to the principles of an embodiment of the invention, when the decoded second audio output to the headset 46 from the second audio decoder 45 is adjusted to the first position, the output of first audio decoder 43 is automatically adjusted to be synchronized with the output of the second audio decoder 45, so that the output sample in the decoded first audio also corresponds to the first position. As such, outputs of the two audio decoders are synchronized. That is, the output samples from the second audio decoder 45 correspond to the output samples from the first audio decoder 43. For example, the PTS associated with the current output sample from the first audio decoder 43 and the PTS associated with the current output sample from the second audio decoder 45 are the same.

As such, the main processor 40 may instruct the first audio decoder 43 to adjust its output by outputting the decoded first audio according to the offset, so that outputs of the first and second audio decoders are synchronized.

In another embodiment, the main processor 40 may instruct the first audio decoder 43 to synchronize with the second audio decoder 45 in response to receipt of an occurrence of the user command to synchronize the playback of the video at the first electronic device and the playback of the second audio at the second electronic device.

An advantage of synchronizing the outputs of the first and second audio decoders 43 and 45 is that a user may send the user command to synchronize the playback of the video at the first electronic device and the playback of the second audio at the second electronic device at any time and the two audio decoders would be ready to perform the synchronization according to the present embodiment of the invention.

In another embodiment, the first and second audios are pre-downloaded to the mobile terminal 4 before the mobile terminal 4 playing back the second audio. In one embodiment, playing back of the second audio may include playing back of the video received by the mobile terminal 4.

In one embodiment, the first and second audios can be downloaded to the second electronic device from the same source, for example, the same web site of a service provider that transmits the program to the first electronic device. In another embodiment, the second audio may be downloaded from a different source from the source transmitting the program to the first electronic device. For example, the program received by the STB 2 is received from a broadcast source for a service provider and the second audio received by the second electronic device is downloaded from a web site sponsored by the service provider.

In fact, when the bandwidth of receiving the second audio by the second electronic device is too small, a user can switch to another source for receiving the second audio. This may happen when the user selects a streaming source that has a very low bandwidth and the user is unable to adjust the playback of the second audio to the first position.

In another embodiment, the main processor 40 is operative or configured to instruct the audio correlator 42 to determine a PTS according to the offset and provide a PTS to the second audio decoder 45 and the second audio decoder 45 should output from a decoded sample associated with the PTS. In another embodiment, the main processor 40 is operative or configured to instruct the audio correlator 42 to provide the same PTS to the first audio decoder 43, so that the first audio decoder 43 should output from a decoded sample associated the PTS. The audio correlator 42 once determines the offset can determines the PTS as follows: determining a decoded audio sample from the first audio decoder 43 that should corresponds to the next received captured audio sample and determining the PTS of the corresponding decoded first audio sample as the desired PTS.

Although the microphone 47 is used as an example for the capturing device for capturing the playback audio from the speaker 33 of the TV 3, the capturing device may be a wireless receiver, such as a Bluetooth receiver at the mobile terminal 4 and the captured first audio signal is simply the decoded first audio signal from the audio decoder 25 from the STB 2 transmitted wirelessly to the wireless terminal 4.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for synchronizing playback of a program including a video and associated first audio at a first electronic device with playback of a second audio associated with the program at a second electronic device that also receives the first audio, the first audio and the second audio being different from each other, the method comprising:
    decoding by the second electronic device, the first audio, and outputting the decoded first audio;
    decoding by the second electronic device, the second audio and outputting the decoded second audio for playing back by the second electronic device;
    receiving a user command to synchronize the playback of the video at the first electronic device and playback of the second audio at the second electronic device from a first position, which is a first time interval away from a beginning of the program in a normal playback of the program, wherein the first position is selectable through the user command; wherein when the playback of the second audio is at the first position, the playback of the program by the first electronic device is at a second position, which is a second time interval away from the beginning of the program in a normal playback;
    responsive to the user command, the method further comprising:
    capturing by a capturing device in the second electronic device, the playback of the first audio at the first electronic device;
    determining by the second electronic device, an offset between the outputted decoded first audio and the captured first audio; and
    adjusting outputting of the decoded second audio according to the offset, so that the playback of the first audio at the first electronic device is synchronized with the playback of the second audio at the second electronic device;
    the method further comprising asking for another user command for an adjustment of the first position when a difference between the first time interval and the second time interval is more than a predefined interval.

2. The method of claim 1, further comprising positioning the playback of the second audio to the first position responsive to a user signal.

3. The method of claim 1, further comprising if determining the offset fails, asking a user to input the user command again, and capturing and determining the offset are repeated.

4. The method of claim 1, wherein decoding the first audio is performed by a first decoder and decoding the second audio is performed by a second decoder, and the method further comprises adjusting, by the first audio decoder, an output by outputting the decoded first audio according to the offset, so that outputs of the first and second audio decoders are synchronized.

5. The method of claim 1, further comprising downloading the first audio and the second audio to the second electronic device before playing back the second audio by the second electronic device.

6. The method of claim 5, wherein the program received by the first electronic device, and the first audio and the second audios received by the second electronic device are downloaded from a first source.

7. The method of claim 5, wherein the program received by the first electronic device is downloaded from a second source different from a first source for downloading the first and second audios to the second electronic device.

8. The method of claim 1, wherein the user command is generated by a user activating an input mechanism.

9. The method of claim 1, further comprising determining a presentation time stamp associated with a sample in the decoded first audio, which corresponds a newly captured audio sample according to the offset, and adjusting playback of the second audio comprising outputting a sample in the decoded second audio associated with the determined presentation time stamp.

10. The method of claim 1, wherein the first electronic device is one of a television receiver, a theater video reproduction device, and a computer.

11. A second electronic device comprising:
first and second audio decoders for respectively decoding first and second audios received by the second electronic device and outputting the decoded first and second audios, the first and second audios associated with a program comprising a video and the first audio and being played back by a first electronic device;
an audio capturing device for capturing the first audio being played back by the first electronic device;
an audio correlator receiving the captured playback first audio and the decoded first audio from the first audio decoder; and
a processor, wherein when the processor receives a user command to synchronize playback of the second audio at the second electronic device with the playback of the video at the first electronic device and playback of the second audio at the second electronic device from a first position, which is a first time interval away from a beginning of the program in a normal playback of the program, wherein the first position is selectable through the user command; wherein when the playback of the second audio is at the first position, the playback of the program by the first electronic device is at a second position, which is a second time interval away from the beginning of the program in a normal playback, the processor is configured to instruct the audio correlator to determine an offset between the received captured playback first audio and the received decoded first audio outputted from the first audio decoder and instruct the second audio decoder to output the decoded second audio according to the offset;
the processor is further configured to ask for another user command for an adjustment of the first position when a difference between the first time interval and the second time interval is more than a predefined interval.

12. The second electronic device of claim 11, wherein the video player positions the playback of the second audio to the first position responsive to a user signal.

13. The second electronic device of claim 11, wherein if determining the offset fails, the processor is configured to ask a user to input the user command again, and instruct the audio correlator to determine the offset again.

14. The second electronic device of claim 11, wherein the processor is configured to instruct the first audio decoder to adjust an output by outputting the decoded first audio according to the offset, so that outputs of the first and second audio decoders are synchronized.

15. The second electronic device of claim 11, wherein the first audio and the second audio are downloaded to the second electronic device before the second electronic device playing back the second audio.

16. The second electronic device of claim 15, wherein the program received by the first electronic device and the first audio and the second audios received by the second electronic device are downloaded from a first source.

17. The second electronic device of claim 15, wherein the program received by the first electronic device is downloaded from a second source different from a first source for downloading the first and second audios to the second electronic device.

18. The second electronic device of claim 11, further comprising an input mechanism for a user to input the user command.

19. The second electronic device of claim 11, wherein the processor is configured to instruct the audio correlator to determine a presentation time stamp associated with a sample in the decoded first audio, which corresponds a newly captured audio sample according to the offset, and instruct the second audio decoder to output a sample in the decoded second audio associating with the determined presentation time stamp.

20. The second electronic device of claim 11, wherein the first electronic device is one of a television receiver, a theater video reproduction device, and a computer.

* * * * *